United States Patent [19]

Walters

[11] 4,037,891

[45] July 26, 1977

[54] GLAND SEAL COMPRESSION

[76] Inventor: Tom Walters, 2102 Mason Blvd., Point Pleasant, W. Va. 25550

[21] Appl. No.: 701,545

[22] Filed: July 1, 1976

[51] Int. Cl.² ............................................. F16C 33/72
[52] U.S. Cl. ..................................... 308/187.1; 82/30
[58] Field of Search .................. 82/30, 31; 308/189.1, 308/187.1, 189

[56] References Cited

U.S. PATENT DOCUMENTS 2,943,803   3/1976   Hafla ................................ 308/189 A Primary Examiner—Richard A. Bertsch

[57] ABSTRACT

A variable gland seal assembly wherein the seal about a cylindrical male inner member is accomplished in a manner that the opposed gland directional seal positioning conical bevelled components upon receiving the constant rate reacting force of a retained selected compression spring provide calculably controlled constant rate opposed conical known compressive symmetrical forces at opposed conical wedging areas upon a symmetrically opposed conical bevelled and opposed annular shouldered seal element producing opposed balanced annular seal wearing areas in a manner that effectively seals about the male inner member and upon other adjacent gland components while permitting said male member to have lineal, radial and torsional movements and substantially absorbing forces creating said male member's movements thus substantially eliminating said forces from reacting upon the gland seal assembly's supporting members and adjacent equipment and the like wherein said gland seal assembly has used the combination of said gland opposed directional seal positioning conical bevelled components calculably confined by said selected compression spring upon said seal element producing said opposed annular seal wearing surfaces at said seals opposed annular shoulders at said opposed conical wedging areas in a manner that said combination provides a wide range choice of seal materials and selected spring compressions to provide a readily variable gland seal adaptations such as for delicate compression of seal materials useful with frangible materials and piping systems, for firm compression of seal materials useful with metallic materials in high and low temperature and pressure piping systems as well as for driven shafting seals.

22 Claims, 12 Drawing Figures

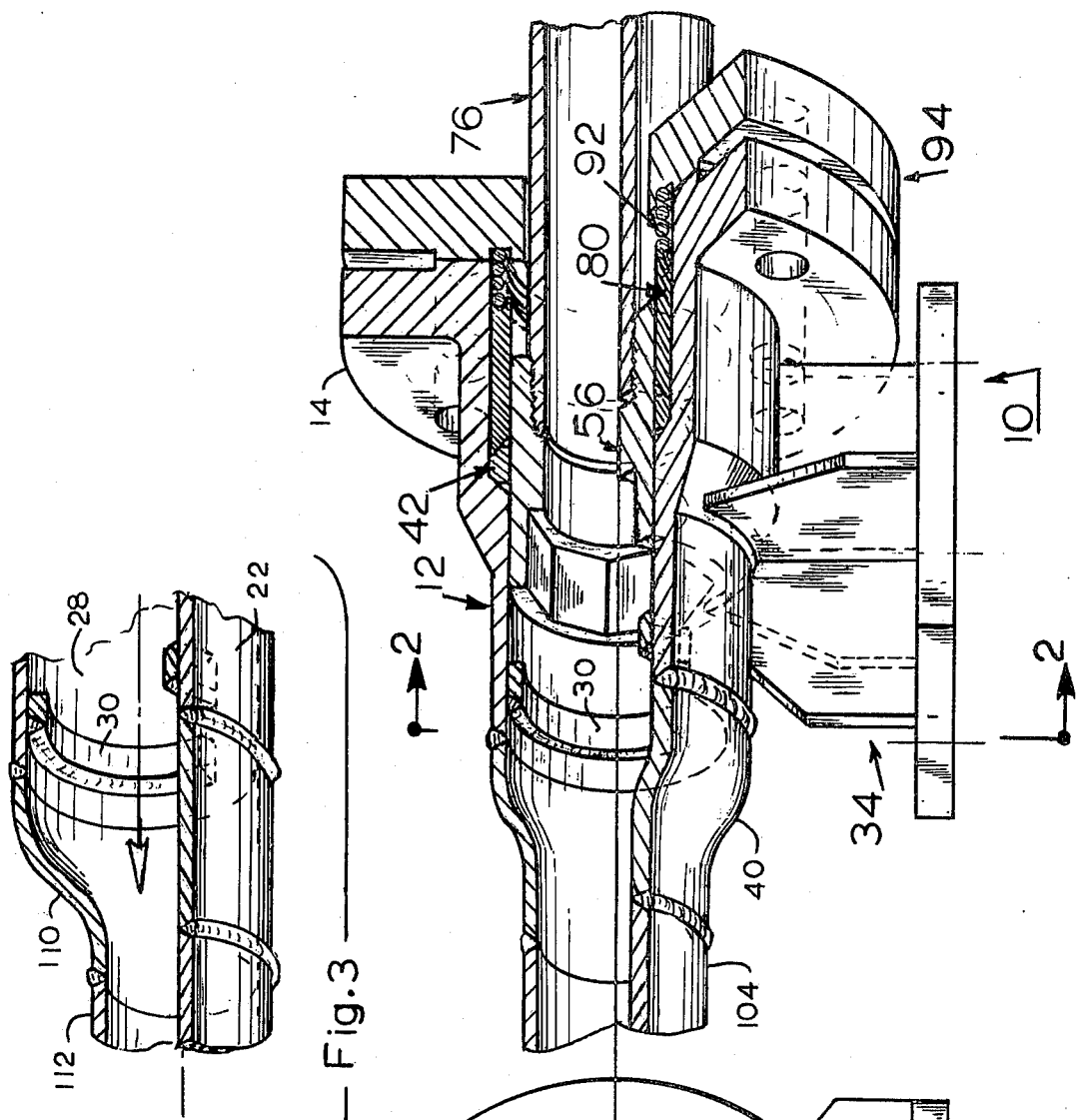
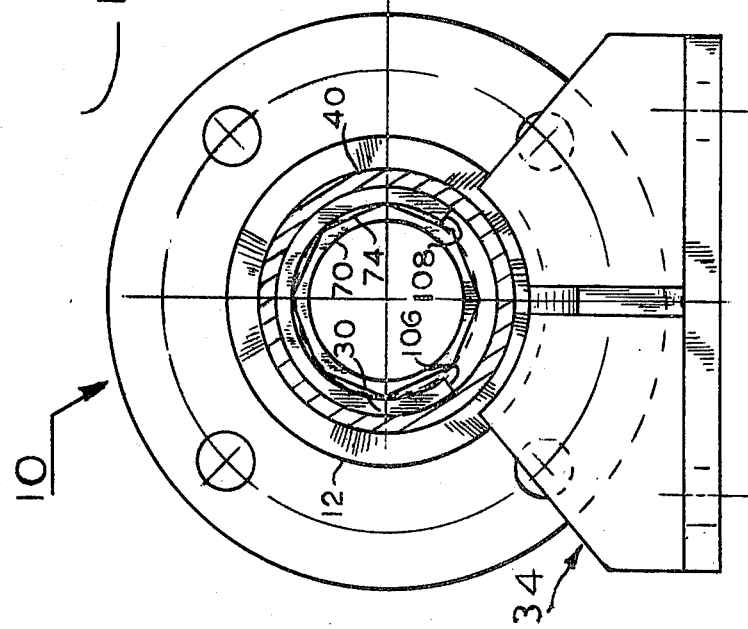

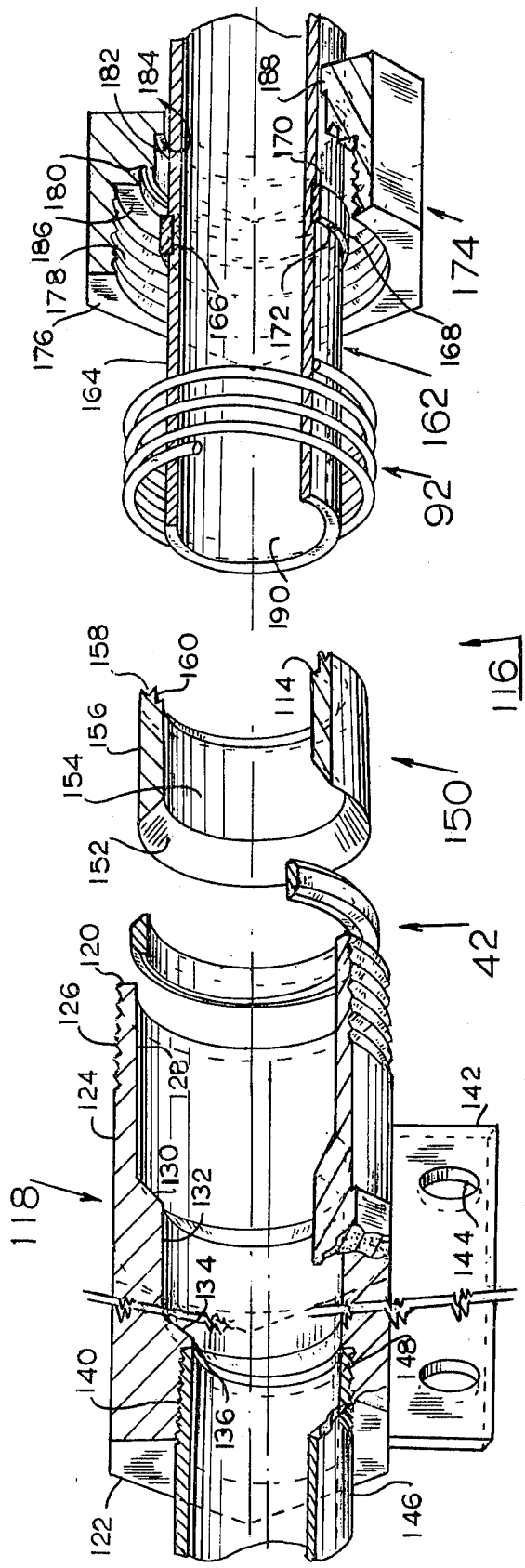
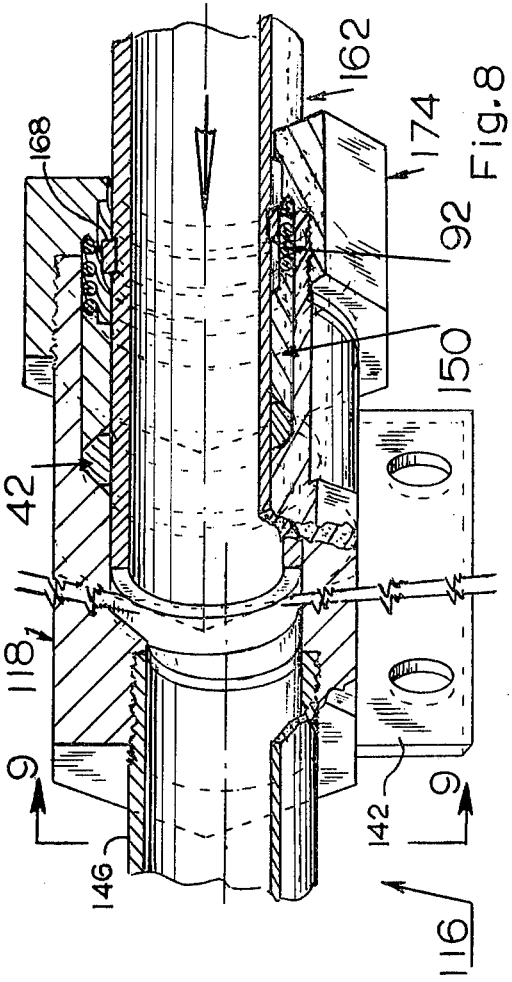
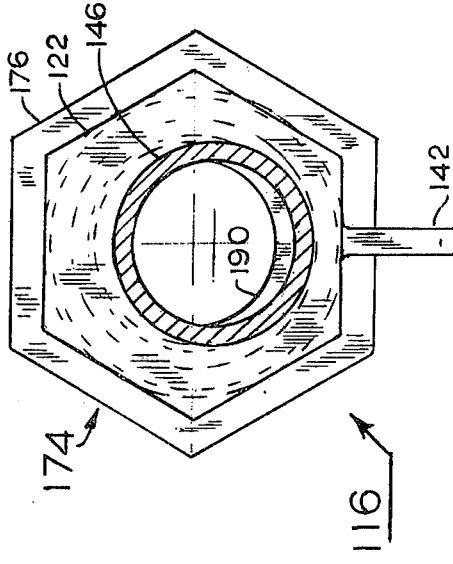

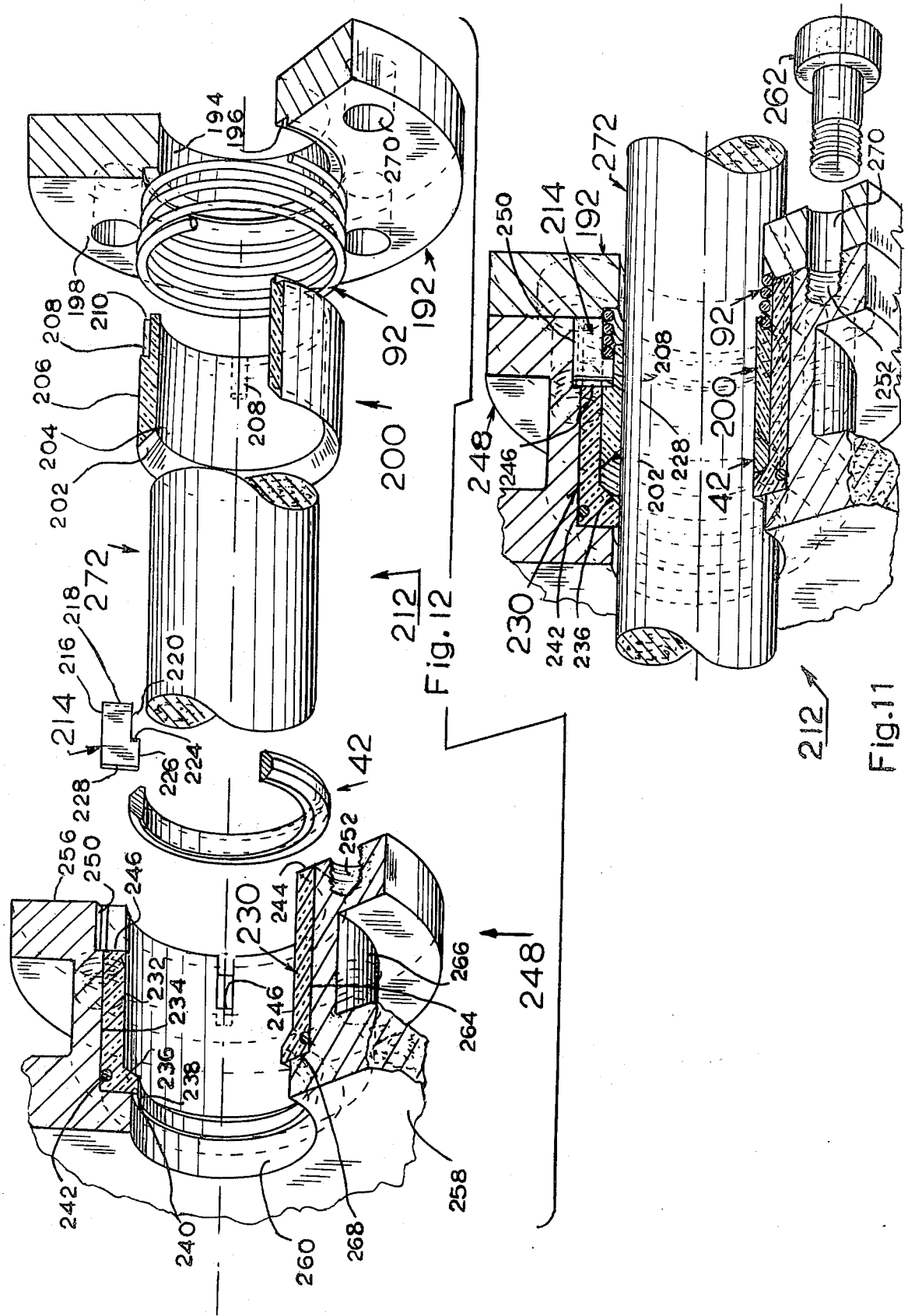

GLAND SEAL COMPRESSION

This invention relates in general to compression type seals in tubular gland seal assemblys for tubular conduits and driven shafting where lineal, rotary and torsional movements within the gland seal are present as well as through which pressurized and high and low temperature fluids and gases are conducted and more particularly to a new and useful manner of controlling the compressive forces upon the seal to extend the reliable life of the seal materials as opposed to present gland designs and introduce a wider range of usage for gland type seals.

Present gland seal designs are essentially bolt tightened arrangements compressing the seal material between two cylindrical members about an inner cylindrical member so that the inner member is considered sealed while slidable, considered meaning that the initial bolt tightening needed periodic attention as the seal became worn loose. The initial and other bolt tightenings may also be so severe as to cause crippling effects upon the seal materials and shorten the reliable life of the seal. Each seal material has its own required compression force range for its reliable life expectancy and present gland designs offer an unknown compressive capability where too little as well as too much seal compression is the generality.

It is, therefore, an important object of the present invention to provide a gland type seal assembly embodying a simple rugged design wherein calculable compressive reacting force upon gland seals is accomplished for pressure piping and vessels in high and low temperature service where expansion, contraction and torsional forces are prevalent as well as for drive shaft seals where lineal and rotary movements are prevalent also to provide seal and seal confining component configurations that produce symmetrical seal deformation upon receiving said calculable compressive reacing force whereupon said force having a known constant rate as used will maintain the calculable seal compression even as the seal wears with the inherent friction of lineal, rotary and torsional movements of the inner male member providing an automatic seal during the longer seal life expectancy.

Further, to provide a gland design to be variable by the choice of seal materials and choice of relative seal compression within a common gland configuration reusable and adaptable to a wide range of applications such as with the gland unit substantially absorbing and eliminating the induced forces that cause the inner male member's lineal, rotary and torsional movements while said unit is acting as an attachment member readily permitting securement to a support structure presenting the gland unit as an anchor and guide support assembly adaptable to the various piping systems especially steam piping systems as an expansion and contraction force absorbing and controlling support and guide member wherein the necessity of cold springing procedures at piping connections and area consuming pipe expanison loops can be eliminated.

Further, to extend the gland seal expansion and contraction force absorbing and controlling support and guide assembly's reliable usage to materials other than metals such as plastics, glass, fiberglass, ceramics, karbate and like frangible piping and equipment systems.

Further, to extend the gland seal lineal, rotary and torsional friction force absorbing and controlling unit design to powered drive shafts, at oil filled gear box seals, motor housing seals, reciprocating machinery shafting gland seals. The invention makes use of suitable busing material for the compression members adjacent to the seal member to provide a reliable busing and seal combination that automatically maintains the desired calculable compressive force upon the seal element located centrally within an essentially standard shaft bushing.

In accordance with the present invention, a female first member is provided with an outward support attachment component for anchoring the unit in a fixed position, said member is also provided with a gland assembly retaining attachment bolting as its upstream end of an inner cylindrical receiving chamber which leads downstream to a conical bevelled section closing inward to a downstream cylindrical receiving chamber that slidably receives the male conduit fluid and gases conveying fourth member. After the male fourth member is positioned as noted said fourth member slidably receives upon its outer cylindrical surface a shouldered annular ring with outward symmetrical axis based conical bevelled seal element second member where the angles of said bevels are complimentary to the conical angle bevel section of the female first member, followed by a cylindrical travel gland third member having a downstream conical bevelled end where the angle of the bevel is complimentary to that of the seal element second member, followed by a selected and guided compression type spring fifth member where said second, third and fifth members are received within the upstream receiving chamber of the female first member whereupon a mating ring flange sixth member is secured on the bolting arrangement at the upstream end of the female first member to compressingly confine the seal element second member to seal about the male fourth member especially at the seal elements opposed annular side shoulders as well as within the conical bevelled confinement.

The securement of the retaining flange sixth member compresses the spring fifth member to convey its reacting force upon the travel gland third member which in turn compresses the seal element second member directionally within opposed conical bevelled wedging confinements of the female first member and the travel gland third member to deform said seal element and tighten same against all adjacent surfaces in a balanced uniform manner and be symmetrically maintained as a reliable seal about adjacent surfaces by the automatic and continual compression rate reacting force of the compression spring fifth member because the shape of the seal element and the wedging confinement of the seal positioning directional conical bevelled members produce an effective seal with the minimum seal element deformation permitting the male fourth member to have lineal movement within limiting abutments of a selected design, rotary and torsional movements as required.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a sectional perspective view showing a sectional elevation of the assembled members of a gland assembly of the present invention.

FIG. 2 is an end view taken substantially at a plane indicated by section line 2—2 in FIG. 1.

FIG. 3 is a partial sectional perspective view showing a sectional elevation of an accentric fitting in lieu of a concentric fitting affixed to the gland complex where trap areas or pockets need be eliminated.

FIG. 8 is a sectional perspective view showing a sectional elevation of the assembled members of a gland assembly of the present invention.

FIG. 9 is an end view taken substantially through a plane indicated by line 9—9 in FIG. 8.

FIG. 10 is a sectional perspective view essentially showing a sectional elevation of the disassembled members shown in FIG. 8.

FIG. 11 is a sectional perspective view showing a sectional elevation of the assembled members of a gland assembly of the present invention.

FIG. 12 is a sectional perspecitve view essentially showing a sectional elevation of the disassembled members shown in FIG. 11.

Figure 4:
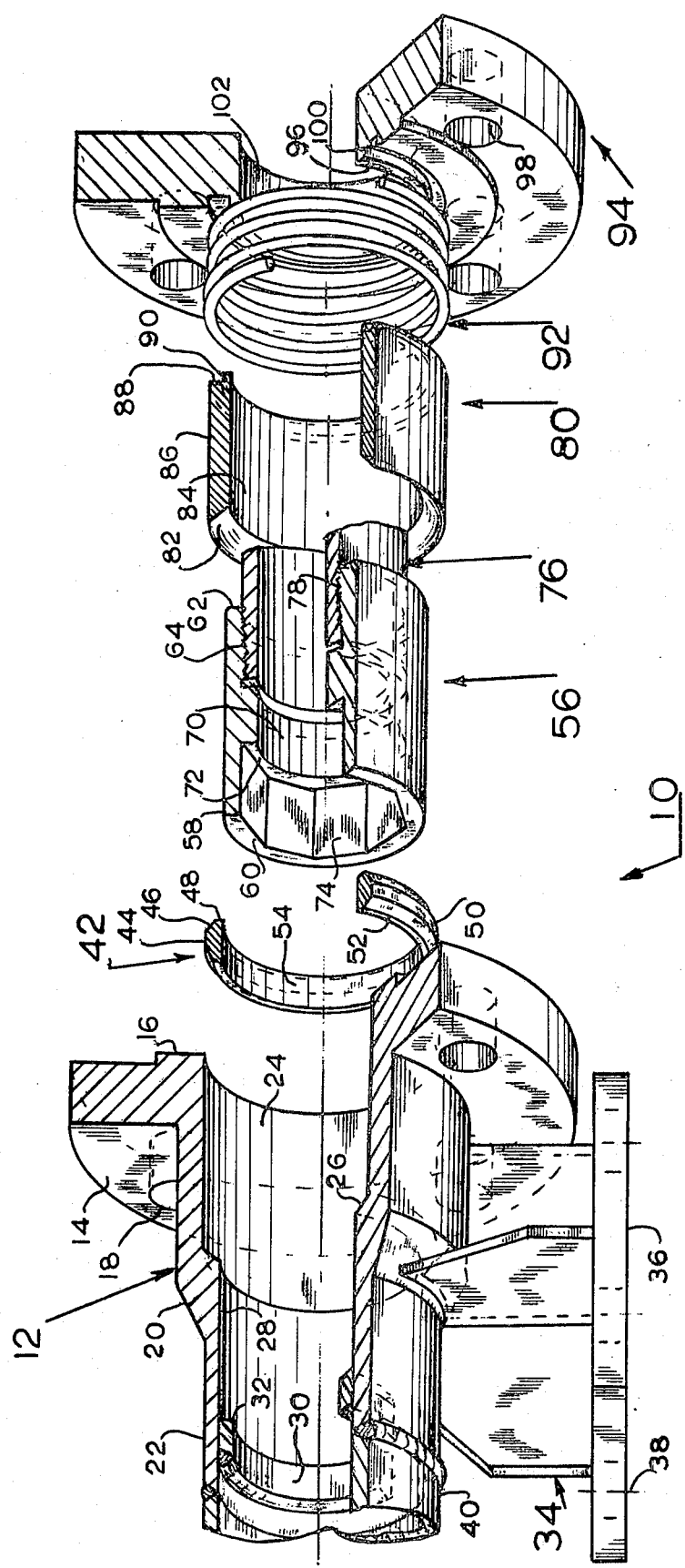
FIG. 4 is a sectional perspective view essentially showing a sectional elevation of the disassembled members shown in FIG. 1.

Referring now to the drawings in detail, FIGS. 1, 2, 3 and 4 show a typical gland assembly 10 constructed in accordance with the present invention. Conduit member 12 has outside anchor attachment support 34 including plate 36 with bolting holes 38, bevel 20 leading to cylindrical section 22 for pipe 40 and the like attachment, has retaining flange 14 at the end of receiving chamber 24 leading to a second receiving chamber 28 at axis based conical bevelled shoulder section 26 that slidably receives conduit member 56 which is secured to conduit member 76 this instance with and at threads 64 and 78. Member 56 has wrench socket 74 adjacent to chamber 70 from shoulder 72 to face 60 to aid in the assembly with conduit 76.

The annular and outward axis based symmetric conical side shouldered bevelled seal member 42 is slidably positioned over member 56 where surface 54 of 42 contacts surface 58 of 56 whereupon the two members as a unit are entered into member 12 where surface 44 of 42 contacts chamber surface 24 of 12 to where bevelled surface 50 of member 42 abuts a complimentary directional conical bevelled shoulder 26 of member 12 whereupon these members are followed by conduit member 80 with inner surface 84 slidably positioned over surface 58 of member 56 and surface 86 of member 80 positioned within chamber 24 of member 12 to where directional conical bevelled surface 82 of member 80 abuts a complimentary bevelled surface 46 of member 42 whereupon these members are followed by compression spring 92 that is slidably received within chamber 24 of member 12 to abut shoulder 88 and be positioned by recess 90 both of member 80, followed by retaining flange 94 with recess 100 to receive and position spring 92, bore 102 for member 76 passage, abutment face 96 to mate with face 16 of flange 14 of member 12 for maintaining assembly functional when bolted as noted.

Shoulders 48 and 52 along with adjacent cylindrical parts of surface 54 of seal member 42, with member 42 being compressed between conical directional bevelled shoulders 26 of member 12 and 82 of member 80 due to the reacting force of spring 92 being retained compressed, deform to tighten evenly against adjacent seal element surfaces to effect a slidable seal between chamber 24 of member 12 and cylindrical surface 58 of member 56. The conical bevelled configuration of seal element 42 along with contacting conical directional bevelled shoulders of 26 of member 12, 82 of member 80 and along with the constant compression rate reacting force of spring 92 the effective initial seal will be maintained as the seal material wears.

Figure 5:
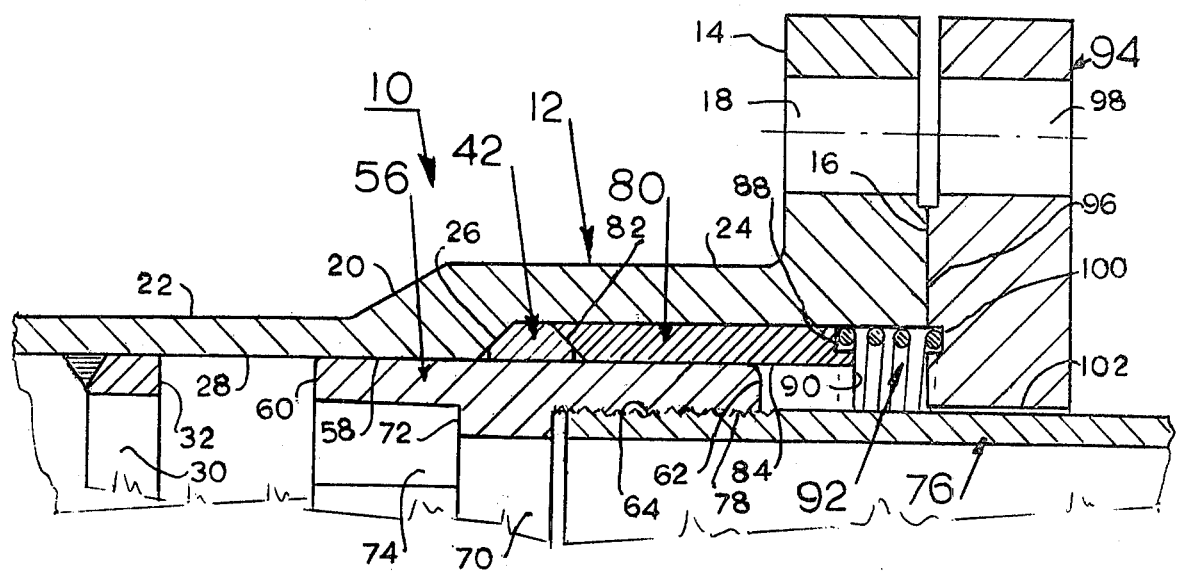
FIG. 5 is a partial sectional elevation view showing the gland members shown in FIG. 1 in an essentially standard operating position.
Figure 6:
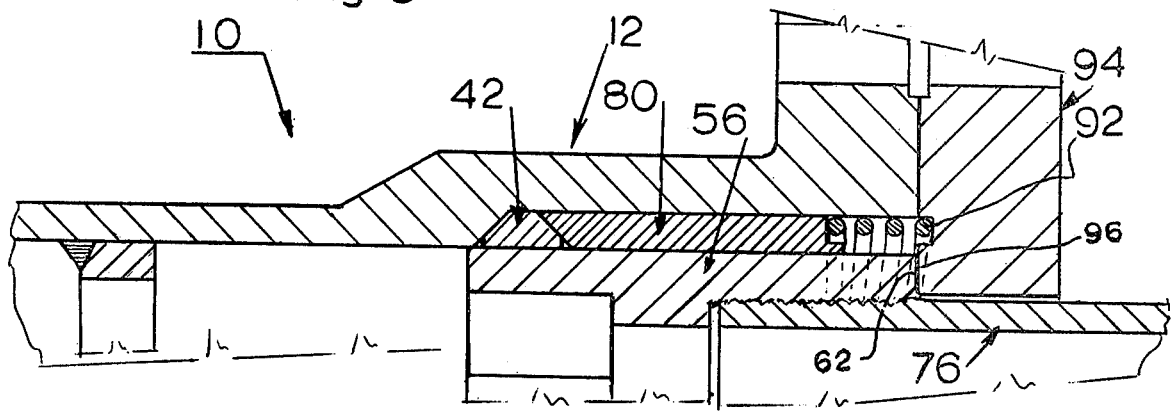
FIG. 6 is a partial sectional elevation view showing the gland members shown in FIG. 1 in an extreme contracted piping condition.
Figure 7:
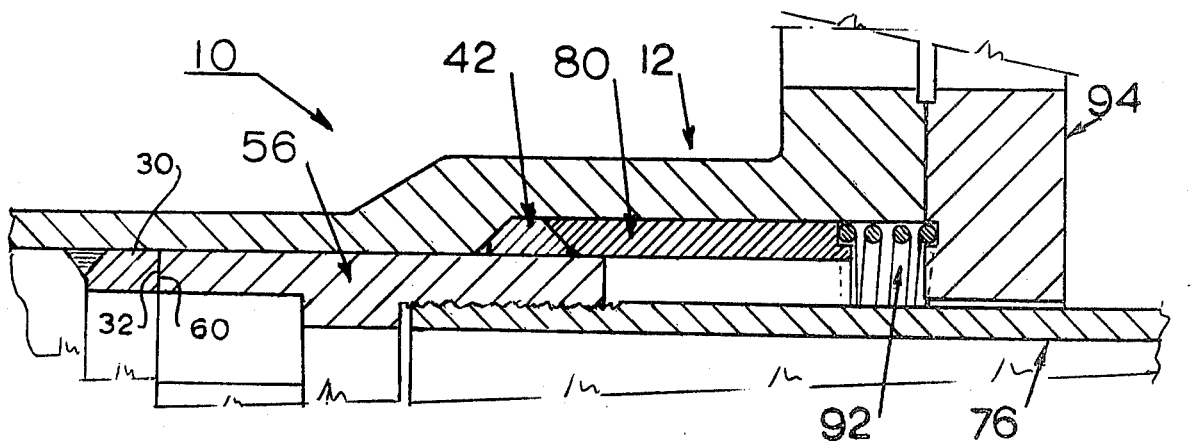
FIG. 7 is a partial sectional elevation view showing the gland members shown in FIG. 1 in an extreme expanded piping condition.

As indicated in FIGS. 5, 6 and 7 conduit member 56, along with conduit member 76, slidably and rotably moves with expansion and contraction forces induced by pressure and thermal expansions and contractions in piping and other system conditions within the gland complex being this instance surface 28 of member 12, surface 54 of member 42 and surface 84 of member 80. Member 56 is maintained within the gland complex one direction by limiting partial annular shoulder 30 within chamber 28 of member 12 as face 60 of member 56 contacts face 32 of shoulder 30, the opposite direction by face 62 of member 56 contacting abutment face 96 of flange 94.

Compression type springs such as member 92 have an exacting calculable reacting force rate and can readily be designed and fabricated to exact required forces to effect the required gland seal within the compressibility range of the seal materials thus presenting a calculable and known constant rate seal compression for the use of a wider range of seal materials and applications as well as extending the reliable seal life of the materials.

FIGS. 8, 9 and 10 show a typical gland assembly 116 constructed in accordance with the present invention that permits the practical and reliable use of plastic, glass, ceramics, karbate and the like frangible piping and equipment materials in the gland seal construction by absorbing reacting forces induced by pressures, thermal and torsional strain conditions upon the piping and equipment. While assembly 116 is functionally comparable to assembly 10, added innovations need be defined.

Conduit member 118 has outside anchor attachment support 142 affixed including bolting holes 144, hexagonal section 122 for wrench fit, cylindrical section 124 with threads 126 at face 120, internal threads 140 to engage threads 148 of pipe 146 and the like which at the engagement abuts shoulder 136 that is adjacent to oblique conical section 134 that leads to chamber 132 that leads to axis based conical directional bevelled shoulder section 130 that opens to chamber 128. Chamber 128 slidably receives seal element 42 to where said shoulder 130 at member 118 contacts a complimentary bevel of 42, traveller gland 150 being positioned within chamber 128 of member 118 by surface 156 of member 150 to where axis based conical directional bevelled surface 152 of member 150 contacts a complimentary bevel of 42, followed by member 162 where surface 164 of member 162 is slidably received within surface of member 150, the inner surface of seal 42 and chamber 132 of member 118, followed by spring 92 which is received and positioned by groove 158 of member 150.

Retaining sleeve member 174 with hexagonal shape 176 for wrench fit is positioned to slide over member 162 at opening 188 to where shoulder 184 can contact face 170 of snap band 168 which is received in groove 166 of member 162 to where positioning groove 180 of member 174 receives spring 92 while engaging threads 178 of member 174 upon threads 126 of member 118 until shoulder 186 of member 174 abuts face 120 of member 118.

Member 162 is limited in lineal travel to where the seal area surface 164 of member 162 is maintained within the gland seal complex by limiting annular split snap band 168 secured to member 162 when positioned within chamber 182 of member 174 by face 170 of member 168 contacting face 184 of member 174 and within recess 160 of member 150 where face 172 of member 168 contacts face 114 at recess 160 of member 150.

The oblique conical frustrum section 134 of member 118 provides the configuration for the inside of pipe 146 to be flush at the bottom area of chamber 132 of member 118 so the product flow passing through chamber 190 of conduit member 162 enters an open no-pocket area and avoids trapping product materials by effecting a full flow area as well as permitting complete pipe line drainage in horizontally positioning of the gland unit.

Another innovation is that at disassembling a piping system and a part thereof using gland unit 116, retaining sleeve 174 is to be disengaged at threads 178 and snap band 168 released from groove 166 so member 162 can be slidably positioned further into chamber 132 of member 118 to permit free lineal and rotary movement of member 162 to disengage other piping components at the opposite end on member 162. It is thus the expansion and contraction gland seal unit also provides the design configurations for removal and replacement of sections of piping systems without disturbing the whole run of piping. This invention is a design break through especially for frangible piping systems that presently rely upon cemented and sealed component joints that provide no such design advantage for the above defined versatilities.

FIG. 11 and 12 show a typical gland assembly 212 constructed in accordance with the present invention wherein the basic components are adapted to reciprocating and rotating drive shafts and the like to function as combination bushings and gland seals. While assembly 212 is functionally comparable to assembly 10, added innovations need be defined.

A typical gear box housing 258 with hub 248, with shaft 272 positioned through shaftway 260 of member 258, has cylindrical section 266 with internal chamber 264 with shoulder 268 that abuts end 240 of gland member 230 when member 230 is slidably received on surface 234 of member 230 within chamber 264 of member 248 with seal element 242 functional between surfaces 234 and of 264. Gland member 230 has axis based conical directional bevel shoulder section 236 within chamber 232 to receive a complimentary bevel of gland seal member 42 also bearing surface 238 to receive shaft 272, notch 246 to be aligned with notch 250 of hub 248 at face of bolting flange 256.

With the above mentioned components in place shaft 272 slidably receives gland seal 42, gland member 200 within bearing surface 204 while surface 206 of member 200 is received by chamber 232 of member 230 to where axis based conical directional bevel shoulder section 202 of member 200 contacts a complimentary bevel of seal 42 and firms said seal against conical directional bevel 236 of member 230 and with recess 208 of member 200 being aligned with notch 246 of member 230, notch 250 of member 248, key 214 is then slidably inserted into notch 250 of member 248, notch 246 of member 230 and recess 208 of member 200 where face 216 of member 214 is slidably received within recess 208 of member 200.

While faces 228 and 218 of member 214 might contact notch 250, 246 and recess ends as well as face 198 of retaining flange 192 but not simultaneously permitting key 214 to remain sliable in the keyed position so as not to convey the reaction force of spring 92 upon members 230 and 248 in a manner that spring 92 will apply said force against member 200.

Spring 92 is then slidably positioned within face 220 of member 214 and onto positioning groove 210 of member 200, followed by retaining flange 192 where opening 194 has clearance about shaft 272 and spring 92 is received and positioned by recess 196 of member 192. Face 198 of member 192 is drawn to and firmly contacts face 256 of member 248 and face 244 of member 230 by cap screws 262 through holes 270 of member 192 engaging taps 252 of member 248. Spring 92 is compressed to react force evenly upon gland member 200 confining seal member 42 directionally to effect a calculable seal about shaft 272 and all other surfaces adjacent to seal member 42.

The innovations of assembly 212 not previously defined with those of assembly 10 are; that the basic expansion gland concept of the present invention is adaptable to and permits the introduction of an improved calculable busing and seal combination for reciprocating and rotary driven shafting; that the busing members are keyed in place nonrotable relative to the shafting to prevent said members from rotating within the housing preventing damage to the housing preventing damage to the housing and seal element; that the bushing members are sealable insert type, as opposed to shrink fit bushings, that can be replaced with the shaft in place and that a choice of applicable seal and bushing materials can be used in the gland design complex.

The directional axis based conical bevelled shoulders of the gland members 200 and 230 contacting complimentary bevelled shoulders of the seal element 42 having opposed annular end souldrs 48 and 52 leave opposed annular triangular voids chambers that are used as wedging areas to effect upon compressive confinement directional annular seal areas at each said shoulder of seal element 42.

The wedging area provide part of the design configurations for an unevenly directed seal confinement each wedging area to produce the maximum reliable usage of the seal element material in a non-crippling manner.

The foregoing is considered as illustrative only of the principles of the invention. Further, since numerous modifications and changes will readily occur to those skilled in the art, it is not desired, and accordingly all suitable modifications and equivalents may be resorted to, falling within the scope of the invention.

What is claimed as new is as follows:

1. A calcuably controlled opposed conical wedging seal compression and anchorable gland seal complex for conveying pressurized liquid and gases consisting of substantially overlapping tubular members with an inner male fourth member axially slidable along and swivelable within other gland members about an axis common to other members in a sealed manner where an outer female first member has an upstream attachment end to subsequently retain the various members compressed, an inner axis based conical directional seal positioning bevelled section leading outward from an inner downstream male fourth member receiving chamber to an inner upstream second, third and fifth member receiving chamber where the second member is an annular seal ring element with opposed axis based conical bevels, complimentary with said directional seal positioning bevelled section of said female first member, leading inward in a manner to form opposed side shoulders at its inner cylindrical male fourth member receiving surface providing said seal element with a cross sectional shape of a substantially shouldered conical frustrum symmetric about a radial plane, where the third member is an annular travel gland which has a leading downstream axis based conical directional seal positioning bevelled end where said bevel is complimentary to the bevel on the seal element second member and leading from said third member's outer cylindrical surface inwardly upstream to its inner cylindical fourth member receiving chamber whereupon when the male fourth member after being received within the female first member's downstream receiving chamber, receives the seal element second member, receives the travel gland third member, followed by a fifth member which is a guidedly positioned compression spring where the second, third and fifth members are slidably received within the upstream receiving chamber of the female first member and compressingly retained therein by a retaining sixth member being firmly secured to the female first member's upstream attachment end in a manner where the configurations of the first and sixth members have lineal movement limiting abutments to contact abutment shoulders on the male fourth member to maintain said fourth member's seal receiving surface in contact with the seal element second member during subsequent fourth member lineal movements wherein said compressed retainment of the seal element second member where the first and thrid member's conical directional seal positioning bevels abut complimentary bevelled surfaces on the seal element second member compressingly deforming said seal element in a manner to effectively be sealed within said conical directional bevelled sections of the first and third members and for said seal element to be effectively sealed around the male fourth member permitting said fourth member to have lineal, rotary and torsional movements while effectively sealed to prevent the escapement of pressurized materials being conveyed within the gland complex where the continual seal confinement and deformation is accomplished by the constant rate compressive reacting force of the selected compressed spring fifth member applied in a non-crippling that assures a longer life expectancy and reliability of the seal element material and other glarid members.

2. The combination of claim 1 wherein said female first member and travel gland third member have axis based conical directional seal positioning bevels that abut complimentary bevelled surfaces on the seal element second member where said directional bevels include configurations that upon the seal element second member compressed confinement about the male fourth member provide a cross sectional shape of a conical frustrum that produces an opposed evenly balanced conical bevelled confinement of said seal element to sealably tighten about the male fourth member.

3. The combination of claim 1 wherein said seal element second member's cross sectional shape is a substantially shouldered conical frustrom where said shoulders include limiting configurations providing axially opposed conical seal wedging are void chambers upon confinement by the first and third gland members about the fourth member.

4. The combination of claim 3 wherein said seal element second member has limiting configurations providing axially opposed conical seal wedging area void chambers upon confinement by the first and third members about the fourth member whereupon the female first member's downstream receiving chamber includes configurations providing for the entry of pressure between said chamber and the male fourth member from the pressurized product being conveyed within the gland seal complex to add a pressure sealing aid to the seal confinement 5. The combination of claim 1 wherein said conical directional seal positioning bevels of the female first member and travel gland third member include configurations that upon the induced compressive force provide the directional conical wedging to deform the seal element second member at opposed sides producing two annular wearing seal areas about the male fourth member.

6. The combination of claim 5 wherein said two annular wearing seal areas are provided about the male fourth member that includes a manner of conical bevelled confinement that substantially absorbs and substantially eliminates lineal rotary and torsional forces transmitted to the male fourth member from various sources from reacting upon piping and the gland seal complex supporting structures and equipment.

7. The combination of claim 1 wherein said seal element second member has a cross sectional shape of a substantially shouldered conical frustrum symmetric about a radial plane where said shouldered frustrum shape includes the configurations to provide opposed and symmetrical seal areas within the gland unit.

8. The combination of claim 1 wherein said male fourth member after being received within the female first memer's downstream receiving chamber, receives the travel gland third member, followed by a fifth member which is a guidedly positioned compression spring where said travel gland third member includes an annular recess to receive said spring in a manner to subsequently guidedly convey said spring's reacting force downstream upon the seal element second member.

9. The combination of claim 1 wherein said male fourth member after being received within the female first member's downstream receiving chamber, receives the seal element second member, receives the travel gland third member, followed by a fifth member which is a guidedly positioned compression spring where the second, third and fifth members are slidably received within the upstream receiving chamber of the female first member and compressingly retained therein by a retaining sixth member being firmly secured to the female first member's upstream attachment end whereupon said compression spring is guidedly positioned and compressingly retained within the gland complex in a manner that includes said spring's inherent reacting force to provide a known calculable automatic constant rate compressive force upon the seal element.

10. The combination of claim 1 wherein said female first member has an inner downstream receiving chamber that includes a downstream adjacent oblique conical section positioned in a manner to provide unrestricted bottom drainage flow of materials being conveyed within the horizontally positioned gland complex.

11. The combination of claim 1 wherein said calculably controlled opposed conical wedging seal compression and anchorable gland seal complex for conveying pressurized liquids and gases consisting of substantially overlapping tubular members with an inner male fourth member axially slidable along and swivelable within other gland members about an axis common to other members in a sealed manner where an outer female first member includes an outer anchoring configuration for attaching the gland complex to structures and the like presenting the unit as a systems anchor and guide gland combination.

12. The combination of claim 1 wherein said inner male fourth member has contact abutment shoulder to aid in maintaining said members's seal receiving surface in contact with the seal element where said abutment shoulder includes the configuration to be easily removable and replaceable while the gland complex is in a piping system for the subsequent removal and replacement of the particular fourth member involved without disturbing downstream sections of said piping systems.

13. The combination of claim 1 wherein said third member is an annular travel gland which includes configurations to be slotted and keyed to be nonrotatable relative to the male fourth member.

14. The combination of claim 1 wherein said female first member's upstream gland member receiving chamber includes the configurations to be separate of the outer housing proper and be slotted to receive a locking key to be keyed to said outer housing and become nonrotatable relative to the male fourth member.

15. The combination of claim 1 wherein said travel gland third member includes configurations for its use as a bearing bushing in the gland seal complex adaptable about rotary and recriprocating shafting.

16. The combination of claim 1 wherein said female first member's gland section includes configurations for its use as a bearing bushing in the gland seal complex adaptable about rotary and reciprocating shafting.

17. The combination of claim 1 wherein said second member is an annular seal ring element with opposed axis based conical bevels with a cross sectional shape of a substantially souldered conical frustrum symmetric about a radial plane where upon being confined about the male fourth member as noted the seal's opposed conical bevelled compression grip receiving areas include greater resistance areas than the seal's area that contacts the male fourth member making said seal element nonrotatable relative to said fourth member extending the seal element design usage to rotary driven shafting.

18. The combination of claim 1 wherein said seal element second member has a cross sectional shape of a substantially shouldered conical frustrum symmetric about a radial plane providing opposed annular shoulders where said shoulders include the configurations to be square faced parallel to a radial plane in a manner that upon the subsequent opposed conical bevelled wedging of said seal element between the axis based conical directional seal positioning bevelled sections of the female first member and the travel gland third member at the compressive deforming confinement of said seal element about the male fourth member the opposed annular inner corners of said square faced shoulders peripherally and initially sealably contact the male fourth member with the minimum seal element deformation.

19. The combination of claim 1 wherein said seal element second member has a substantially conical side shouldered frustrum cross sectional shape symmetrical about a radial plane where said section includes configuration such as six annular contact deformed seal corners that occur at the cross sectionally cupping of the seal element upon compressing a selected strong compression spring fifth member for its strong reacting force to subsequently compress said seal element by the securement of the retaining flange sixth member as noted for the use of essentially firm graphited seal element materials extending the gland seal complex usage to high temperature adaptations such as steam piping systems as expansion and contraction glands for substantially absorbing and substantially eliminating expansion and contraction and torsional induced forces from reacting upon said piping systems and the gland seal complex supporting structures and equipment.

20. The combination of claim 1 wherein said female first member and travel gland third member have axis based conical directional seal positioning bevelled sections where said positioning bevelled sections maintain the seal element second member in its effective seal design configuration during minimum compressive confinement suitable for the use of essentially elastomer seal materials extending the gland seal complex usage to frangible piping systems for substantially absorbing and substantially eliminating expansion and contraction and torsional induced forces from reacting upon frangible piping systems and the gland seal complex supporting structures and equipment.

21. The combination of claim 1 wherein said continual seal confinement and deformation is accomplished by the constant rate compressive reacting force of the compressed spring fifth member applied in a non-crippling manner that assures a longer life expectancy and reliability of the seal element material and other gland members said seal confinement and deformation provides an effective and reliable seal within and about all adjacent members during sudden changes of lineal and torsional movement impact shock of variable temperature and pressure forces, weight differentials and related irregular forces transmitted to the male fourth member since the inherent recoil capability of the spring fifth member as used permits said type of seal confinement and deformation to float in a balanced manner with said recoil movement and sealably readjust to the male fourth member's subsequent positioning automatically.

22. The combination of claim 1 wherein said seal element second member is confined about the male fourth member by axis based conical directional seal positioning complimentary bevelled sections of the female first and travel gland third members where said first and third members include configurations that provide cylindrical receiving chambers each side of the centrally positioned seal element second member that slidably receive said fourth member in a manner of tolerance that protects said seal element from excessive radial and cantilever weight and force irregularities being induced through the male fourth member.

* * * * *